United States Patent [19]

Bechen

[11] Patent Number: 4,677,014
[45] Date of Patent: Jun. 30, 1987

[54] IMPREGNATED GASKET AND METHOD OF MAKING THE SAME

[75] Inventor: Heribert Bechen, Cologne, Fed. Rep. of Germany

[73] Assignee: Goetze AG, Burscheid, Fed. Rep. of Germany

[21] Appl. No.: 807,783

[22] Filed: Dec. 11, 1985

[30] Foreign Application Priority Data

Dec. 15, 1984 [DE] Fed. Rep. of Germany ....... 3445870

[51] Int. Cl.⁴ .................. B05D 3/06; B32B 27/04; F16J 15/12
[52] U.S. Cl. ................. 428/195; 522/150; 277/235 A; 277/235 B; 427/44; 427/282; 427/352; 428/290
[58] Field of Search ........... 204/159.14; 428/195, 428/290; 427/44, 352, 282; 277/235 A, 235 B

[56] References Cited

U.S. PATENT DOCUMENTS 3,265,527 8/1966 Adelman .................. 428/283
3,970,322 7/1976 Stecher et al. .
4,291,087 9/1981 Warburton .
4,463,049 7/1984 Kracke .................... 428/281

FOREIGN PATENT DOCUMENTS 1074341 1/1960 Fed. Rep. of Germany .

Primary Examiner—James C. Cannon
Attorney, Agent, or Firm—Spencer & Frank

[57] ABSTRACT

A soft-material gasket formed of a non-woven fiber mat has pores which are at least partially filled with an impregnating agent. The impregnating agent is cross-linked by electron beam irradiation to locally differing degrees.

5 Claims, 3 Drawing Figures

IMPREGNATED GASKET AND METHOD OF MAKING THE SAME

BACKGROUND OF THE INVENTION

1. Field of the Invention

The present invention relates to an impregnated soft, flat gasket, particularly for use as a cylinder head gasket for internal-combustion engines, to a manufacturing method for producing such gaskets, and to an article useful in the manufacturing method.

2. Discussion of the Prior Art

Gaskets for internal-combustion engines, particularly cylinder head gaskets, but also exhaust flange gaskets or other flat seals are made of non-woven fiber mats, which may be metal reinforced, and are impregnated primarily to increase their strength, improve their resistance to the media to be sealed and improve their sealing behavior. Impregnating agents are, for example, those according to German Auslegeschrift No. 2,304,505, which corresponds to U.S. Pat. No. 3,970,322 to Stecher et al, which are cross-linkable and solvent-free impregnating agents, and are usually thermally cross-linked in the gasket, such as by means of peroxides contained therein. Preferred impregnating agents are recited to be liquid polybutadienes, polyacrylates, unsaturated polyesters or liquid silicone elastomers which undergo cross-linking by polyaddition via carbon double bonds without the release of gaseous substances. In practice, it is also known, for example, from U.S. Pat. No. 4,291,087 to Warburton, Jr., to cross-link the impregnating agents, which are composed of polyacrylates, by the influence of high-energy electron beams.

When installed between the sealing faces of an engine block and a cylinder head, cylinder head gaskets are stressed to different degrees depending on a predetermined compressive pressure which is a function of engine design. To compensate for this, it is customary, for example, according to the earlier-mentioned German Auslegeschrift No. 2,304,505, to keep the regions of the soft material below the metallic flanges free of impregnating agent, particularly at the combustion chamber openings, to thereby increase the sealing pressure in these stressed zones.

German Auslegeschrift No. 1,074,341 teaches to locally vary the deformation characteristic of a gasket in adaptation to its particular use so as to equalize the sealing pressure and avoid cylinder warping. According to a preferred solution disclosed in this reference, a soft gasket material is impregnated to influence its ultimate deformability by varying the level of absorption of an impregnating agent from location to location.

It has been found, however, that it is difficult in practice to impregnate soft-material gasket mats by partial absorption or by varying the level of absorption from location to location. Thus, according to the German Auslegeschrift No. 2,304,505, cut-out gaskets are provided with edge casings and are preferably impregnated by immersion, the casings shielding the gasket material therebeneath. In spite of the shielding casings, however, penetration of impregnating agent under the casings cannot be completely avoided by this process. Likewise, if the gaskets are partially impregnated as disclosed in the German Auslegeschrift No. 1,074,341, the liquid impregnating agent has been found to gradually spread over the entire gasket and result in the gasket being undesirably impregnated over its entire surface area.

SUMMARY OF THE INVENTION

It is therefore an object of the present invention to provide an impregnated, soft material gasket having a deformation characteristic which differs from location to location. The method of producing such a gasket should be as simple and as economical as possible and, primarily, should produce, in a reliable manner, gaskets having a uniform, defined, locally varying deformation characteristic which can be regulated.

This is accomplished according to the present invention by a gasket which is impregnated with an impregnating agent which is cross-linked to locally varying degrees by means of electron radiation. The impregnating agent cross-linkable by electron beam irradiation may be an impregnating agent identified in the above-discussed prior art.

The cross-linking process causes the plastic, easily deformable or flowable impregnating agent to be converted into a harder, much less deformable state. Depending on the degree of cross-linking of the impregnating agent, the impregnated gasket thus has locally varying deformation characteristic which ranges from a plastic, easily deformable state corresponding to a slightly cross-linked impregnating agent to a state of high resistance to deformation corresponding to a substantially or almost completely cross-linked impregnating agent. The spatial arrangement of the zones of substantially or slightly cross-linked impregnating agent is preferably predetermined empirically, corresponding to the specific use.

In the method of manufacturing a gasket according to the present invention, a soft gasket material, which may be a metal-reinforced material, is impregnated according to any of the processes known in the art, with an impregnating agent composed of a liquid cross-linkable by electron beam irradiation and, optionally, one or more cross-linking agents and/or other additives. One surface of the impregnated gasket material is covered by a mask, which is a template article made of a material which permits an electron beam to penetrate to varying degrees in a predetermined pattern-wise configuration. Thereafter, the impregnating agent is cross-linked by irradiation of the impregnated gasket material through the mask with a focused beam of electrons. The focused electron beam is preferably guided over the area of the mask in a grid-like pattern. In this way, the degree of cross-linking may be locally varied in the finished gasket. The process may be repeated on the other side of the impregnated material.

According to the mask pattern covering the gasket, the electron beam penetrates the impregnated gasket material, thereby delivering a controlled pattern of electron beam energy of varying intensity, which correspondingly cross-links the impregnating agent according to the predetermined pattern. The mask is provided with a predetermined pattern of openings through which the directed electron beam impinges on and cross-links the impregnating agent of the impregnated gasket material. Shielded regions of the impregnated gasket material are then not cross-linked.

In the alternative, the mask may be a foil made of a material which is permeable to electron beams to a predetermined degree. The foil is provided with punched-out openings through which the electron beam can pass through to the impregnated gasket material without being attenuated. In the regions of the gasket material where the impregnating agent is not to be cross-linked, the foil mask is appropriately covered with metal strips made of an electron beam impermeable material and in the region where the impregnating agent is to be cross-linked only slightly, the foil thickness is selected so that part of the electron beam energy is filtered out.

According to a further feature of the invention, the uncross-linked portions of the gasket are extracted by means of a solvent vapor or liquid. The uncross-linked and/or only slightly cross-linked impregnating agents are thus soluble and are easily dissolved out of the gasket, thereby producing zones free of impregnating agent, for example, along the combustion chamber edges of a cylinder head gasket which are to be subsequently encased. If, for example polyacrylate is used as the cross linkable impregnating agent, the solvent may be petrolether.

The present invention also contemplates precross-linking the impregnating agent in the impregnated gasket material according to any suitable conventional method, such as thermally precross-linking, and to subsequently complete the cross-linking by means of electron beam irradiation and the use of masks. In this way, the irradiation time required to achieve the desired cross-linking for the finished impregnated gasket can be reduced.

Thus, the present invention provides an impregnated gasket having regions in which the impregnating agent has been cross-linked to varying degrees and, optionally, regions having no impregnating agent, the impregnating agent having been removed. The gasket has a deformation characteristic, in response to an applied surface pressure, which varies from location to location along the surface thereof. The degree of cross-linking of the impregnating agent in the gasket may thus be adapted to optimally provide the desired deformation characteristics required by the structure of the corresponding machine parts with which the gasket will be used. The gasket is therefore able to effectively seal the joined parts and, particularly in internal-combustion engines, to effectively counteract any warping of the cylinders.

By using production masks provided with openings, locally varying thickness and, optionally, overlays of electron beam impermeable material, the degree of cross-linking of the impregnating agent can be controlled and can be set to meet the conditions for the respective use. In this way, it is possible to mass produce impregnated gaskets simply, economically and reproducibly, so that the gaskets have optimally adapted deformation characteristics.

DESCRIPTION OF THE PREFERRED EMBODIMENT

Figure 1:
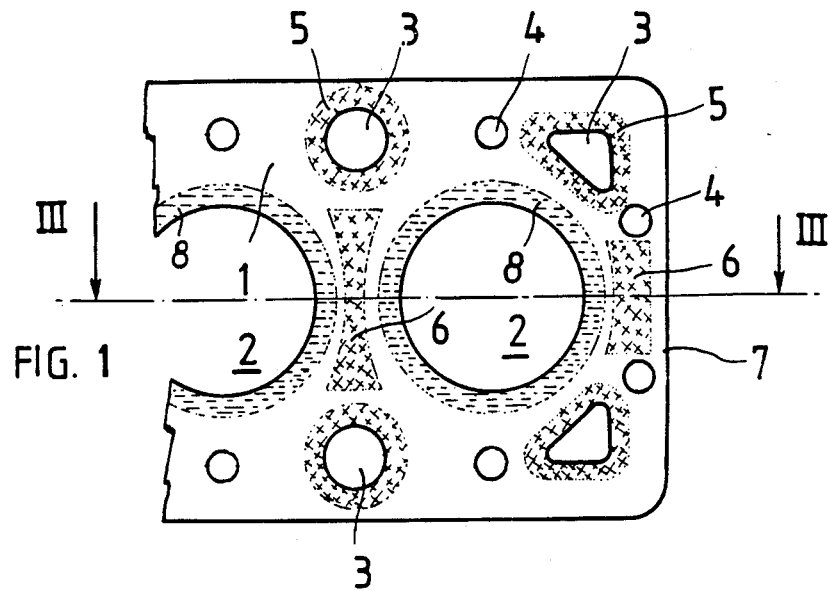
FIG. 1 is a top plan view of a portion of a cylinder head gasket according to a preferred embodiment of the invention.

FIG. 1 shows gasket 1 provided with combustion chamber openings 2, fluid openings 3 and screw openings 4. An impregnating agent is extensively cross-linked in zones 5 around fluid openings 3 so that an improved sealing pressure, sealing effect and media resistance are characteristic of these zones 5. In the regions 6 between adjacent combustion chamber openings 2 and between the end face 7 of gasket 1 and a combustion chamber opening 2, the impregnating agent is likewise cross-linked to a greater degree in order to increase sealing pressure. Regions 8, which surround combustion chamber openings 2 and which, in the finished gasket, are encased in metal, are free of impregnating agent since the uncross-linked impregnating agent has been solvent-extracted. In the regions of gasket 1 which are under less stress, the impregnating agent is cross-linked to an average degree and is rendered form-stable thereby.

Figure 2:
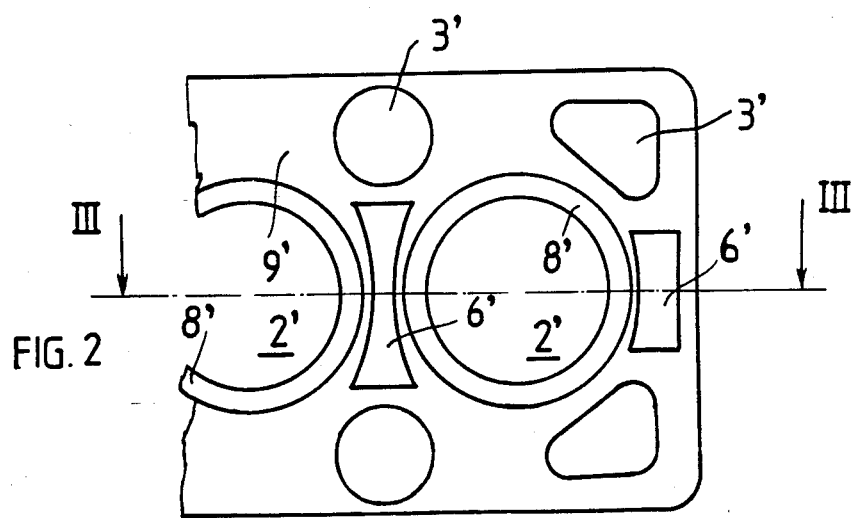
FIG. 2 is a top plan view of a portion of a mask for producing the gasket according to FIG. 1.
Figure 3:
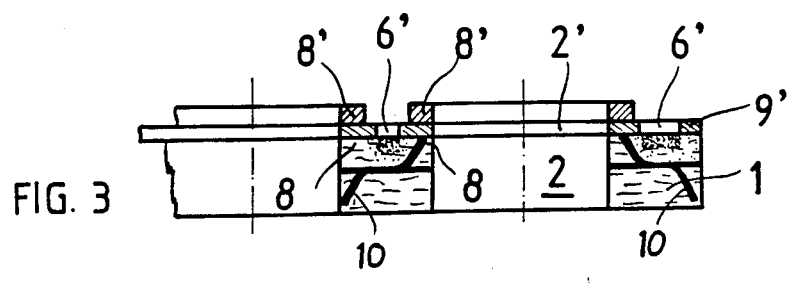
FIG. 3 is a sectional view of the two articles of FIGS. 1 and 2 in a superposed state, taken along line III—III.

FIG. 2 shows an aluminum mask 9' used in an electron beam treatment of the gasket 1, while sectional FIG. 3 shows the mask 9' positioned on the top face of the gasket 1 which includes internal metal reinforcements 10.

The mask 9' is a plate or sheet composed of aluminum foil which easily transmits electron beam energy and is provided with openings 2' and 3' to be aligned with respective openings 2 and 3 of the cylinder head gasket of FIG. 1 therewith. Openings 3' are larger than openings 3 in FIG. 1 by an extent which corresponds to the width of the zones 5. Openings 6' are provided as additional apertures so that during electron beam irradiation, the beam can impinge on gasket 1 with full intensity and thereby extensively cross-link the impregnating agent. All around openings 2', lead coverings 8' have been applied to mask 9'. Lead coverings 8' each have a width which corresponds to the width of regions 8 in FIG. 1. The lead covering 8' is electron beam impermeable and functions to shield the gasket from the effect of the electron beam. The impregnating agent disposed below lead covering 8' during the irradiation process remains uncross-linked and can be removed by extraction. The aluminum foil of mask 9' attenuates the intensity of the electron beam only slightly. As the electron beam passes through the aluminum foil, the intensity of the beam is slightly reduced, whereby the impregnating agent disposed therebelow in the remaining surface regions is cross-linked correspondingly during the irradiation process so as to become form-stable.

It will be understood that the above description of the present invention is susceptible to various modifications, changes and adaptations, and the same are intended to be comprehended within the meaning and range of equivalents of the appended claims.

I claim:

1. A method of making a soft-material gasket formed of a non-woven fiber mat having pores being at least partially filled with a cross-linkable impregnating agent, comprising the step of cross-linking the impregnating agent in the mat to locally differing degrees by electron beam irradiation of varying intensity.

2. A method as defined in claim 3, further comprising the step of removing uncross-linked and, at the most, slightly cross-linked impregnating agent from said mat by a solvent subsequent to said cross-linking step to provide impregnating agent-free zones in said mat.

3. A method as defined in claim 3, further comprising the step of superposing over said mat, prior to said cross-linking step, a mask having regions of differing permeability for electron beam energy, whereby the mat is irradiated with an electron beam of locally varying intensity after it has passed through said mat.

4. A method as defined in claim 5, further comprising the steps of substantially shielding predetermined zones of said mat from electron beam irradiation by electron beam impermeable areas of said mask to preserve the impregnating agent in said predetermined zones in an uncross-linked or, at the most, in a slightly cross-linked state and removing uncross-linked and slightly cross-linked impregnating agent from said mat by a solvent subsequent to said cross-linking step to provide impregnating agent-free zones in said mat.

5. A soft-material gasket formed of a non-woven fiber mat having zones being at least partially filled with a cross-linked impregnating agent, obtained by a process comprising the step of cross-linking the impregnating agent in the mat to locally differing degrees by electron beam irradiation of varying intensity.

* * * * *